(12) United States Patent
Desantis (10) Patent No.: US 11,991,984 B2
(45) Date of Patent: May 28, 2024

(54) PET GROOMING BLADE STORAGE TRAY (71) Applicant: Sharon Renee Desantis, Jupiter, FL (US)

(72) Inventor: Sharon Renee Desantis, Jupiter, FL (US)

( * ) Notice: Subject to any disclaimer, the term of this patent is extended or adjusted under 35 U.S.C. 154(b) by 0 days.

(21) Appl. No.: 18/155,125

(22) Filed: Jan. 17, 2023

(65) Prior Publication Data
US 2023/0225289 A1   Jul. 20, 2023

Related U.S. Application Data (60) Provisional application No. 63/300,087, filed on Jan. 17, 2022.

(51) Int. Cl.
*A01K 13/00* (2006.01)
*A45D 44/02* (2006.01)
*A47B 81/00* (2006.01)

(52) U.S. Cl.
CPC ............ *A01K 13/00* (2013.01); *A45D 44/02* (2013.01); *A47B 81/00* (2013.01)

(58) Field of Classification Search
CPC ........ A01K 13/00; A45D 44/02; A45D 44/04; A47B 81/00
See application file for complete search history.

(56) References Cited

U.S. PATENT DOCUMENTS

| 2,749,198 | A | * | 6/1956 | Berber | A47B 81/00 |
| | | | | | 312/285 |
| 3,460,899 | A | * | 8/1969 | Miller | A45D 44/04 |
| | | | | | 312/351 |
| 3,715,038 | A | * | 2/1973 | Winkler | A45D 44/04 |
| | | | | | 211/133.4 |
| 3,975,068 | A | * | 8/1976 | Speckin | A47B 57/26 |
| | | | | | 108/151 |
| 4,412,618 | A | * | 11/1983 | La Conte | B25H 3/06 |
| | | | | | 211/13.1 |
| 4,446,972 | A | * | 5/1984 | Sussman | A47G 29/08 |
| | | | | | 211/60.1 |
| 5,379,903 | A | * | 1/1995 | Smith | H02G 11/02 |
| | | | | | 132/289 |
| 5,755,180 | A | * | 5/1998 | Smith | A01K 13/00 |
| | | | | | 40/725 |
| 5,803,265 | A | * | 9/1998 | Bergerman | A47B 23/02 |
| | | | | | 206/557 |
| 5,819,960 | A | * | 10/1998 | Bonazza | A47F 5/04 |
| | | | | | 211/133.4 |

(Continued)

FOREIGN PATENT DOCUMENTS

| DE | 1016418 B | * | 9/1957 |
| GB | 741245 A | * | 11/1955 |
| KR | 20100051598 A | * | 5/2010 |

*Primary Examiner* — Stanton L Krycinski (74) *Attorney, Agent, or Firm* — McHale & Slavin, P.A.

(57) ABSTRACT

A storage tray for clipper and trimmer cutting blades for use in pet grooming. The storage tray is securable to a vertical arm of a conventional pet grooming table allowing the table top to remain obstacle free. The storage tray includes a fan for faster heat dissipation from heated cutting blades. In addition, or as an alternative, marble surfaces are used for the storage tray slanted surfaces to enhance heat dissipation. An extension tray can be coupled to the storage tray with receptacles for scissors, clippers and a cell phone.

14 Claims, 9 Drawing Sheets

(56) References Cited

U.S. PATENT DOCUMENTS

| | | | | |
|---|---|---|---|---|
| 5,934,634 A * | 8/1999 | Lindblom | | A47F 5/06 |
| | | | | 211/133.4 |
| D429,934 S * | 8/2000 | Hofman | | D6/525 |
| 6,170,680 B1 * | 1/2001 | Hung | | A47C 1/11 |
| | | | | 211/119.007 |
| D475,229 S * | 6/2003 | Suero | | A47K 3/281 |
| | | | | D6/525 |
| 6,591,952 B1 * | 7/2003 | Randall | | A45D 44/02 |
| | | | | 191/12.4 |
| 6,688,238 B1 * | 2/2004 | Alexiou | | A47K 3/281 |
| | | | | 108/42 |
| 6,705,468 B1 * | 3/2004 | Hall | | A01K 13/00 |
| | | | | 220/23.88 |
| 6,837,386 B1 * | 1/2005 | Kent | | A47F 5/04 |
| | | | | 211/205 |
| 6,968,961 B1 * | 11/2005 | Peete | | A45D 44/04 |
| | | | | 211/70.6 |
| 7,028,853 B1 * | 4/2006 | Simms | | A45D 8/002 |
| | | | | D3/901 |
| 7,104,620 B2 * | 9/2006 | Atkinson | | A47B 81/00 |
| | | | | 312/204 |
| 7,213,951 B2 * | 5/2007 | Cowan | | A47B 87/0246 |
| | | | | 362/406 |
| 7,513,361 B1 * | 4/2009 | Mills, Jr. | | A45D 44/00 |
| | | | | 206/234 |
| 7,617,936 B2 * | 11/2009 | Barnett, Jr. | | B65D 25/06 |
| | | | | 206/576 |
| D607,607 S * | 1/2010 | Russell | | D28/38 |
| 7,909,162 B1 * | 3/2011 | Barrett | | A45D 44/00 |
| | | | | 132/286 |
| 7,946,253 B2 * | 5/2011 | Smith | | A01K 13/001 |
| | | | | 119/756 |
| 7,967,136 B2 * | 6/2011 | Bryant, Jr. | | A45D 44/02 |
| | | | | 206/234 |
| 8,544,623 B1 * | 10/2013 | Murphy | | H02G 11/02 |
| | | | | 191/12.4 |
| 8,851,095 B2 * | 10/2014 | LeAnna | | A45B 3/00 |
| | | | | 135/120.1 |
| 9,532,638 B2 * | 1/2017 | Davis | | A47F 7/005 |
| 9,801,469 B2 * | 10/2017 | Hodge | | A45D 44/04 |
| 10,413,069 B1 * | 9/2019 | Colon | | A47C 7/622 |
| D891,085 S * | 7/2020 | Martin | | A45D 44/04 |
| | | | | D3/315 |
| 2006/0186015 A1 * | 8/2006 | Abshire | | A45D 44/04 |
| | | | | 206/528 |
| 2006/0201895 A1 * | 9/2006 | Jackson | | H01H 9/025 |
| | | | | 211/26.1 |
| 2009/0223846 A1 * | 9/2009 | Gonzalez | | A45D 27/24 |
| | | | | 206/372 |
| 2011/0248531 A1 * | 10/2011 | Powell | | A47C 1/11 |
| | | | | 297/163 |
| 2012/0205497 A1 * | 8/2012 | Hunt | | A47B 81/00 |
| | | | | 248/346.5 |
| 2014/0366390 A1 * | 12/2014 | Lampley | | B65H 75/34 |
| | | | | 30/537 |
| 2015/0282596 A1 * | 10/2015 | Davis | | A47F 7/0028 |
| | | | | 242/400 |
| 2017/0196342 A1 * | 7/2017 | Martin | | A45D 44/04 |
| 2022/0039533 A1 * | 2/2022 | Siler | | A45D 27/46 |
| 2023/0240433 A1 * | 8/2023 | Boatman-Tate | | A45D 44/02 |
| | | | | 132/200 |

\* cited by examiner

PET GROOMING BLADE STORAGE TRAY

CROSS REFERENCE TO RELATED APPLICATION

In accordance with 37 C.F.R. 1.76, a claim of priority is included in an Application Data Sheet filed concurrently herewith. Accordingly, the present invention claims priority to U.S. Provisional Patent Application No. 63/300,087 filed Jan. 17, 2022, entitled "PET LOOMING BLADE COOLING TRAY."

FIELD OF THE INVENTION

The invention is directed to the field of pet grooming and, in particular, to a storage tray for pet grooming clipper and trimmer blades.

BACKGROUND OF THE INVENTION

Pet grooming appliances, commonly referred to as clippers and/or trimmers, include interchangeable cutting blades for clipping and trimming pet hair. The interchangeable cutting blades permit the use of different types of cutting blades to treat the hair types found with various breeds of animals.

Skip tooth blades are a standard option to start a grooming procedure while fine-teeth blades have closely spaced teeth ideal for thin and soft haired pets. Blades can be further sized for coat length. The type of blade and blade size allow the pet groomer to carefully groom the pet to beyond the pet owner's expectations.

Blade construction may be chrome plated stainless steel, carbon, silver or titanium. Cutter blade sizes can be expressed in numbers from 3 to 50. For instance: number 3 blades may provide a 13 mm coat length; number blades 5 may provide a 6 mm coat length; number 7 blade may provide a 3.2 mm coat length; number 9 blade may provide a 2 mm coat length; number 30 blade may provide a 0.5 mm coat length to name a few. Commonly it takes 2-4 blades to groom one dog. For instance, Poodle groomers would likely use a number 7 blade for the body, number 10 or 15 for the head, number 3 or 5 for the legs, and number 10 or 15 for the tail. During the grooming process, the cutting blade will heat up and, if left unchecked, can burn the skin of the animal being groomed. For this reason blade changes are frequently made allowing a cutting blade to cool off during use. Preferably the various interchangeable blades are kept near the grooming table so that the pet being groomed is not left unattended.

Thus, a need exists for a storage tray securable to a grooming table for use in dissipating the heat from cutting blades using a platform elevated above the grooming table.

SUMMARY OF THE INVENTION

Disclosed is a storage tray having a plurality of slanted surfaces, each configured to support a trimmer blade. Upon resting a hot blade against the surface, a cooling fan passes air through the storage tray to dissipate heat quickly and permit the interchangeable use of blades during grooming sessions. Securing the storage tray to a grooming table pole vertical pole allows the lower surface of the tray to be exposed to air circulation allowing faster heat dissipation and keeps the grooming table free of obstructions. The cooling fan is powered through a USB cable coupling to an external power source.

In the instant invention, the storage tray has a generally rectangular main body constructed of plastic, the bottom of the storage tray having a plurality of through holes. The tray has a plurality of separate sections, each section having a slanted surface upon constructed and arranged to hold an individual cutting blade. In another embodiment, marble or ceramic material can placed over the slanted surface to provide enhanced heat dissipation. The storage tray is attached to the vertical arm of a grooming table by fasteners. When in use, the storage tray is easily accessible by the groomer for insertion and retrieval of specific cutting blades during a pet grooming session, which the cooling fans quickly dissipates heat from cutting blades placed on the storage tray. An extension tray can be attached to the storage tray to hold clippers, scissors and the like items commonly used during the grooming process. A cell phone holder is electrical coupled to the USB fan cord to keep the cordage off the grooming table.

An objective of the invention is to provide a support tray for clipper and trimmer blades that is securable to the vertical arm of a conventional grooming table.

Another objective of the invention is to provide a support tray containing cooling fans or a marble material for use in cooling clipper and trimmer blades.

Still another objective of the invention is take advantage of mounting the support tray on a vertical arm to allowing air circulation beneath the support tray, as well as keep the grooming table open for the grooming process.

Yet still another objective of the invention is to provide an economical support tray that can be sized to fit four or more cutting blades allowing ease of access to the pet groomer and assuring cutting blades are cooled quickly allowing reuse.

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Now referring to FIG. 1-5, illustrated is one embodiment of the present invention and the manner in which it is used, with like components numbered consistently throughout. Disclosed is a grooming blade storage tray 10 formed from a rectangular frame member preferably rigid plastic. Aluminum or other lightweight rigid material may also be used. The storage tray 10 having a front wall 12, a rear wall 14, a first side wall 16, and a second side wall 18. The second side wall 18 second forming an access door 15. Between the first side wall 16 and second sidewall 18 are slanted assembly support members 20 constructed and arranged to support a thin sheet of marble material 22 on a leading surface 24 of the support member 20, the trailing surface 26 may be used to place trimmers have cooled so that a blade that is cooling down on the marble material 22 is not accidently placed back into the surface. Preferably the walls and slanted blade storage sections 12 are comprised of plastic. It is noted that the illustrated tray 10 in the figures has four sections. To ease in drawing clarity only a single section 12 is enumerated, the remaining sections forming a mirror image thereof. A tray with 2-8 sections 12 is contemplated to be within the scope of this invention. The tray 10 is mounted to the vertical arm 50 of the grooming table, see FIG. 10. The placement of the marble material 22 on the slanted surface in each section 12 may be opposite on each side of the vertical arm for ease of accessing the cutter blades.

Figure 1:
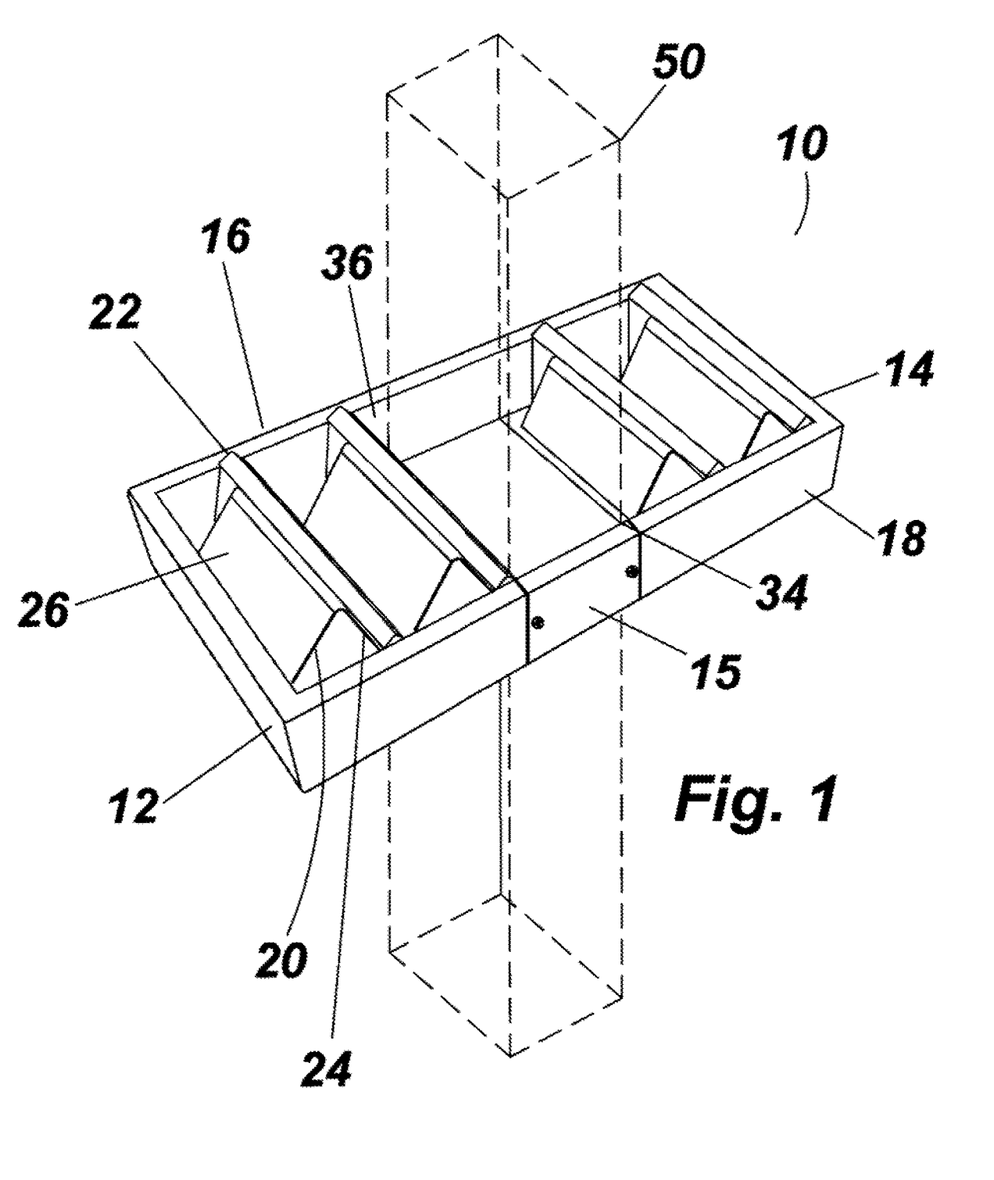
FIG. 1 is a perspective view of the blade tray as installed on the vertical arm of the grooming table.
Figure 2:
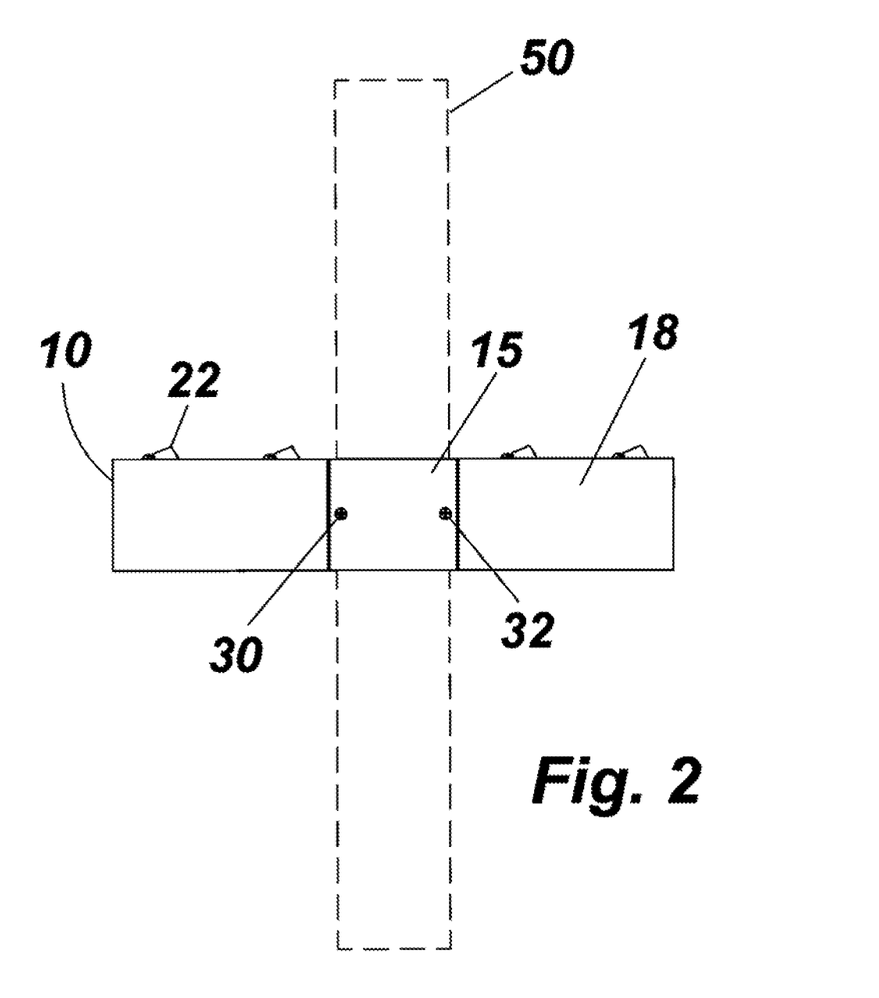
FIG. 2 is a first side view of the blade tray as installed on the vertical arm of the grooming table.

FIG. 2 illustrates sidewall 18 with access door 15 secured to the sidewall 18 by fasteners 30, 32. The access door 15 is temporarily removed from the sidewall 18 allowing access to cavity 34 within the tray 10. The cavity can accommodate up to a one inch square vertical arm 50 by use of the appropriate foam rubber spacer 36 providing a friction fit wherein the access door is fastened to the sidewall to engage all sides of the vertical arm 50.

Figure 3:
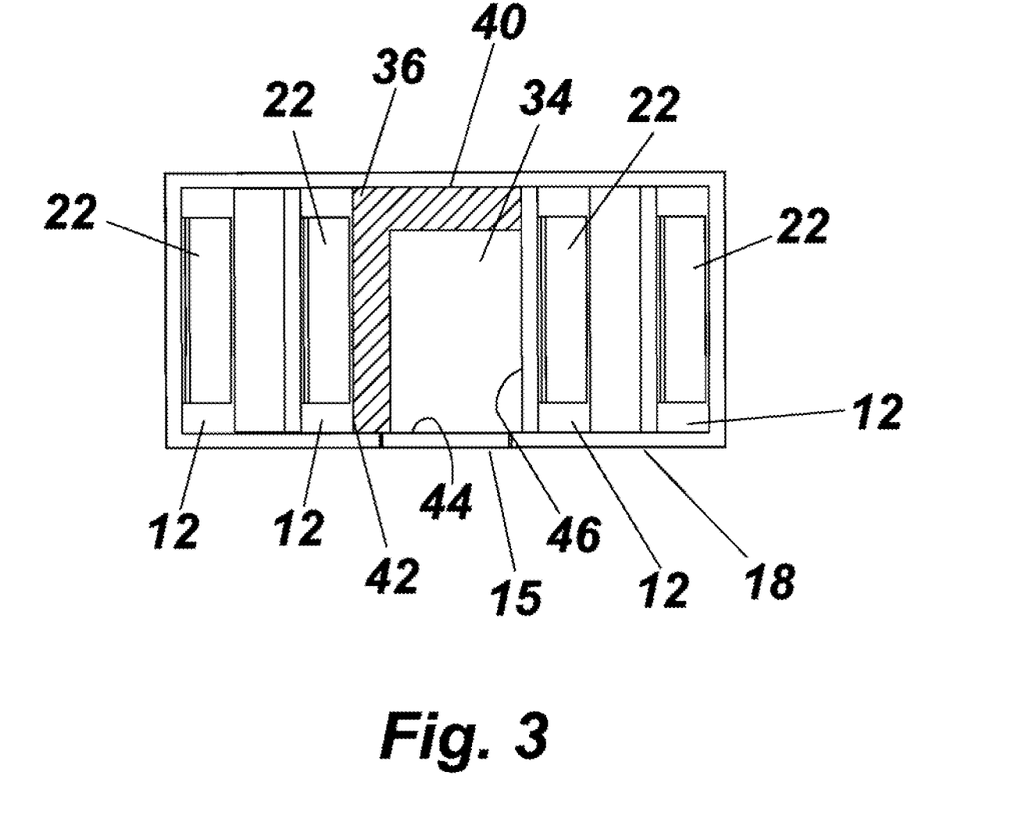
FIG. 3 is a top view of the blade tray.
Figure 4:
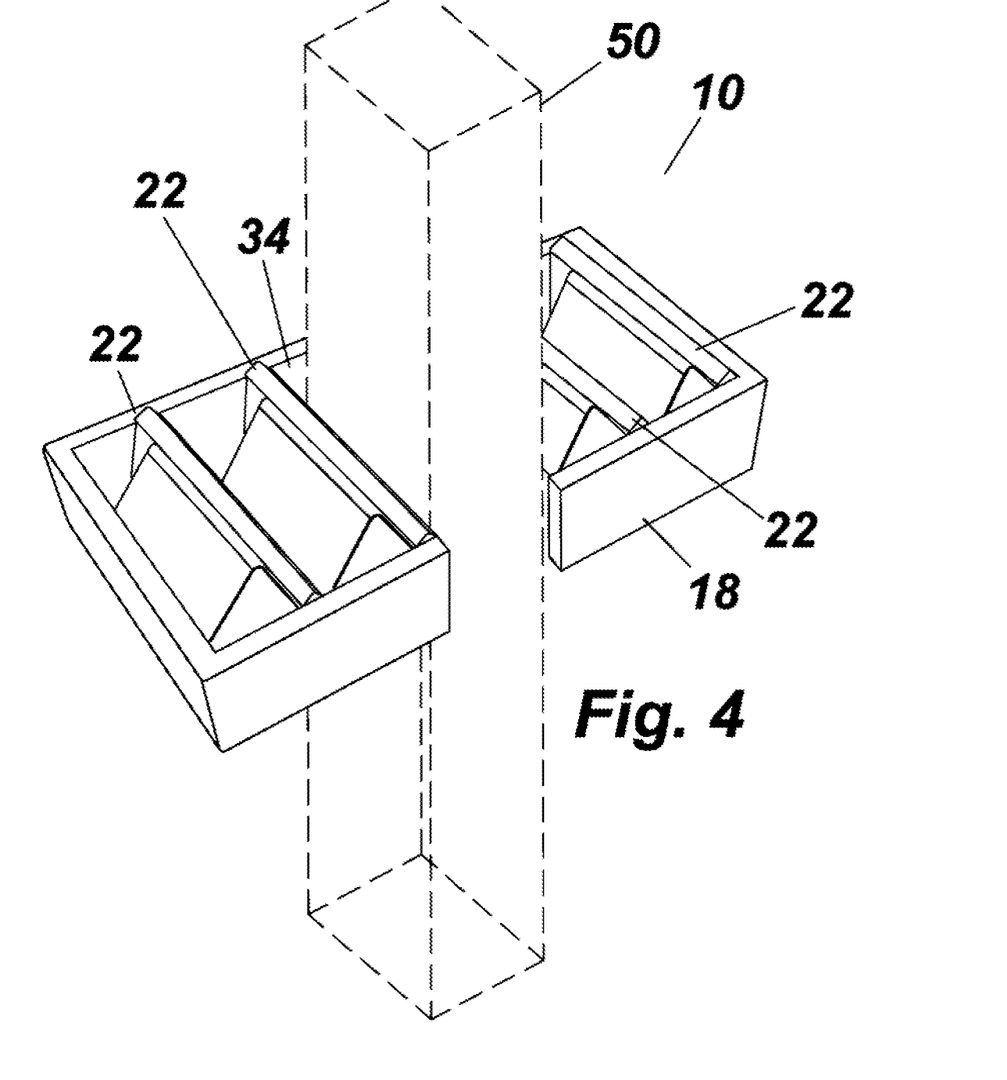
FIG. 4 is a top perspective view of the blade tray as installed on the vertical arm of the grooming table.

FIG. 3 is an upper view of the storage tray 10 depicting the cavity for receipt of the vertical arm, not shown. The foam rubber spacer 36 depicted can be easily compressed with the attachment of the access door 15, sufficient to support the weight of the tray 10 and any blades place thereon. In the preferred embodiment the rubber space 36 is placed on two inner walls 40 and 42, to assure alignment with the vertical arm 50 along inner side walls 44 and 46. FIG. 4 depicts the storage tray 10 with the access door 15 removed from the sidewall 18 allowing attachment to, or removal from, the vertical arm 50.

Figure 5:
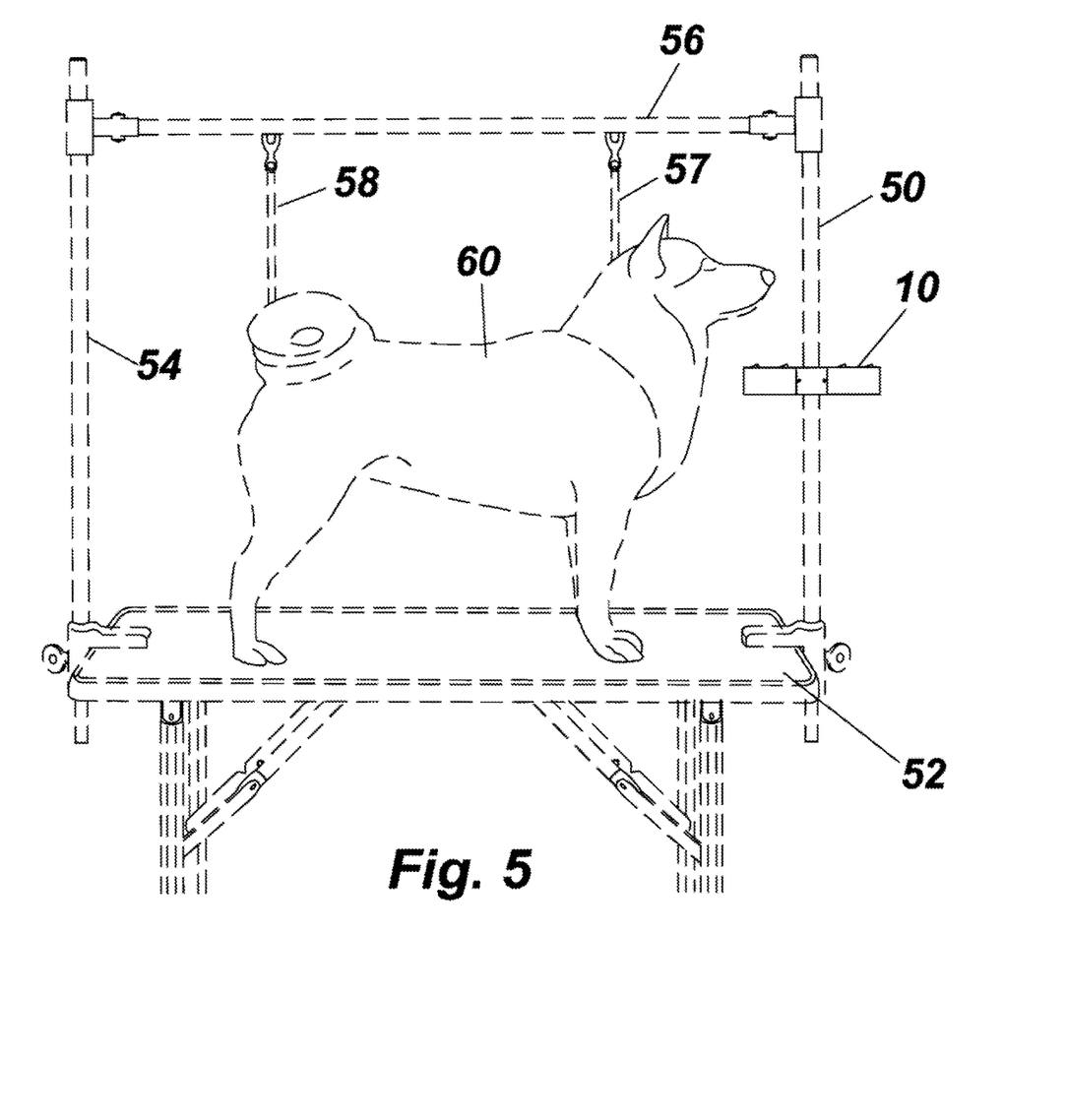
FIG. 5 is perspective view of the blade tray installed on a grooming table.

FIG. 5 depicts a conventional grooming table 52 with a vertical arm 50 extending upwardly from the table 52 to a position above the animal's frame 60. The vertical arm is commonly used to harness the pet in a stance on the table. In this illustration a second vertical arm 54 is used in combination with the first vertical arm 50 to hold up a horizontal bar 56 used to position the animal's frame 60 in a properly controlled position for grooming using alignment straps 57 and 58.

Referring now to FIGS. 6-9 disclosed is an embodiment that allows cooling by use of a marble or the like heat sink 85, and/or by use of a cooling fan 100. In this embodiment the storage tray 70 is a frame member 72 having a support plate 74 with an upper surface 76 and a lower surface 78 forming a thickness therebetween, the thickness depending upon the material employed with sufficient thickness to provide for the rigidity. The frame member 72 has a length generally about 270 mm and a width of generally about 124 mm. The support plate 74 has a plurality of vent holes 80 extending between the upper 76 and lower 78 surface. The frame member 72 further having a front side wall 82 spaced apart from a rear side wall 84, and a left side wall 86 spaced apart from a right side wall 88. The side walls extending upwardly from the upper surface 76 of the support plate 74. In the preferred embodiment the frame member 72 is constructed from plastic or aluminum. The frame member 72 having a shape that allows manufacturing by use of a 3D printer when constructed of plastic.

The support plate 74 includes a plurality of slanted tray surfaces 90 positioned between the left side wall 86 and the right side wall 88. The slanted surface 90 constructed and arranged to receive a cutting blade, not shown. In one embodiment the slanted tray surface 90 may include a marble or ceramic heat sink 85 placed over a slanted tray surface 90 which operates to dissipate the cutting blade heat. In operation the groomer may have multiple cutting blades placed on the slanted tray surfaces 90 wherein the cutting blades can be changed out so that the pet is not subjected to a hot blade. Conventional cutting blades use a mechanical shearing action resulting in friction that produces appreciable heat and can burn the pet. Frequent changing of the cutting blades is seen as a benefit to the welfare of the pet. A cooling fan 100 is secured to the lower surface 78 of the floor section. The cooling fan 100 electrically coupled to a power source and used to force air through the vent holes 80 to assist in dissipating heat from cutting blades placed on each slanted surface 90. The cooling fan 100 includes a USB plug 102 for electrically coupling to a power source having a USB port. The power source can be an electrical outlet or a portable rechargeable battery.

A slide member 110 for securing the frame member 72 to the vertical grooming arm 180 of a pet grooming table. Attachment can be with fasteners or tabs for interlocking. The slide member 110 having at least one aperture 112 constructed and arranged to be slidably positioned over the vertically disposed grooming arm 150. A bracket member 120 comprising a first element 122 releaseably coupled to a second element 124 using fasteners 126 is positioned around the grooming arm wherein the bracket member 120 frictionally engages the grooming arm and operates as a platform to maintain the storage tray 70 at a height above the grooming table.

In a previous embodiment the clamp mechanism is defined as a slide member attached to the rear wall of the frame member as illustrated in the previously described embodiment FIGS. 1-5. In this embodiment the clamp mechanism is defined as cavity bounded between the rear wall and a slanted surface, and the left side wall and the right side wall. A portion of the right side wall, access door, is releaseably attached forming an access door, the cavity including at least one compressible foam rubber spacer to frictionally engage the vertical grooming arm for securing the frame member thereto. The foam rubber spacer compressed against the vertical arm and secured in position by attachment of the access door. In another embodiment, a leg, not shown, may extend downward from a lower surface of the support plate, floor for securement by use of a hand screw, wherein the hand screw may be used to frictionally engage the vertical arm for securement of the frame member to the vertical arm.

Figure 6:
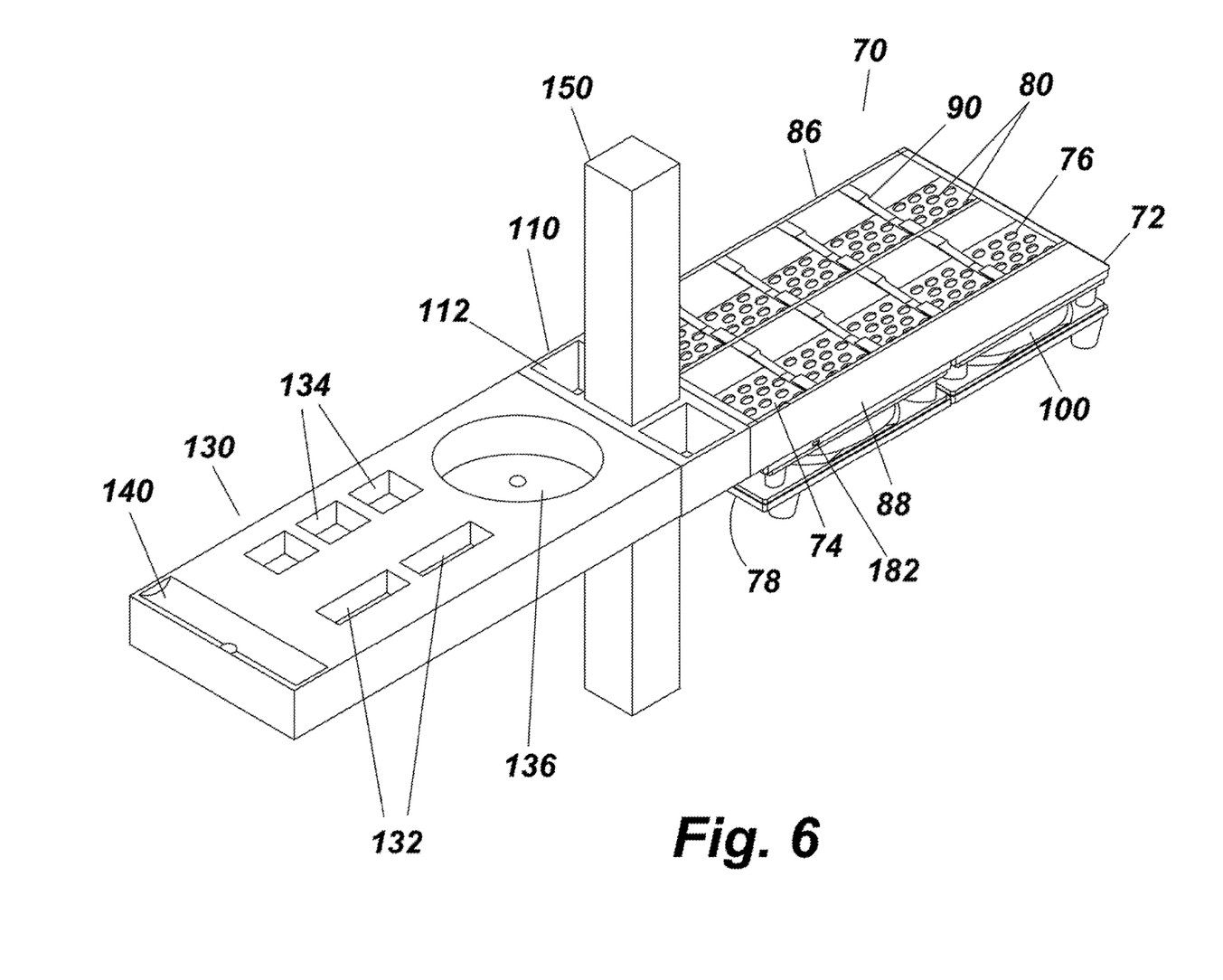
FIG. 6 is a perspective view of a blade and extension tray.
Figure 7:
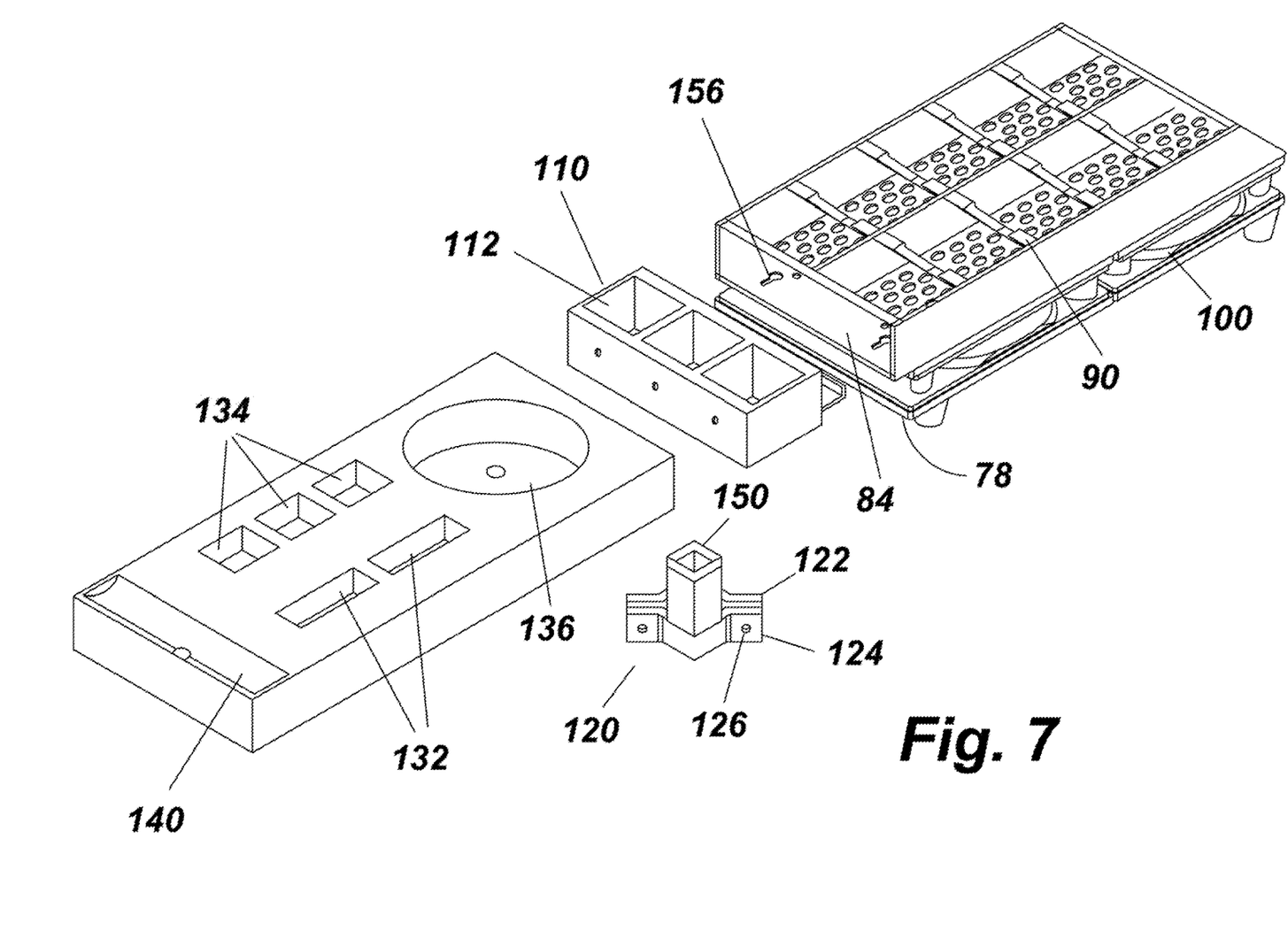
FIG. 7 is an exploded view thereof.
Figure 8:
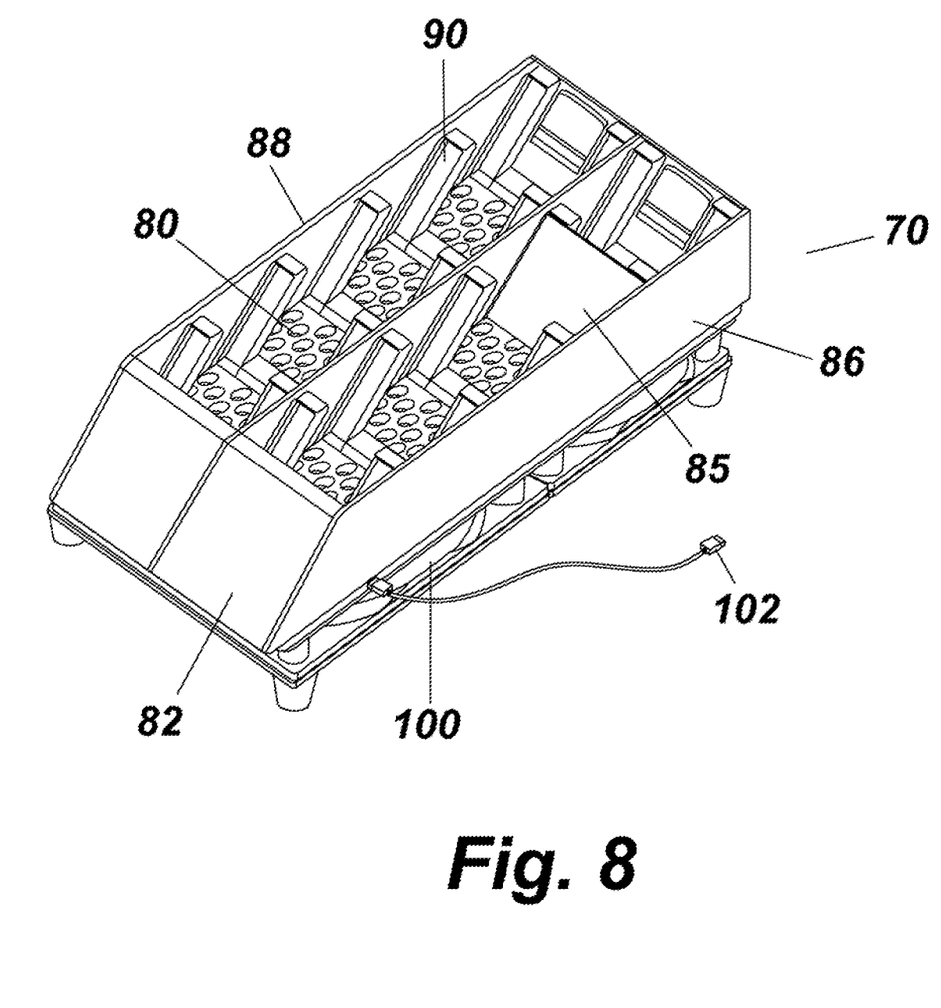
FIG. 8 is a upper perspective view of the blade tray.
Figure 9:
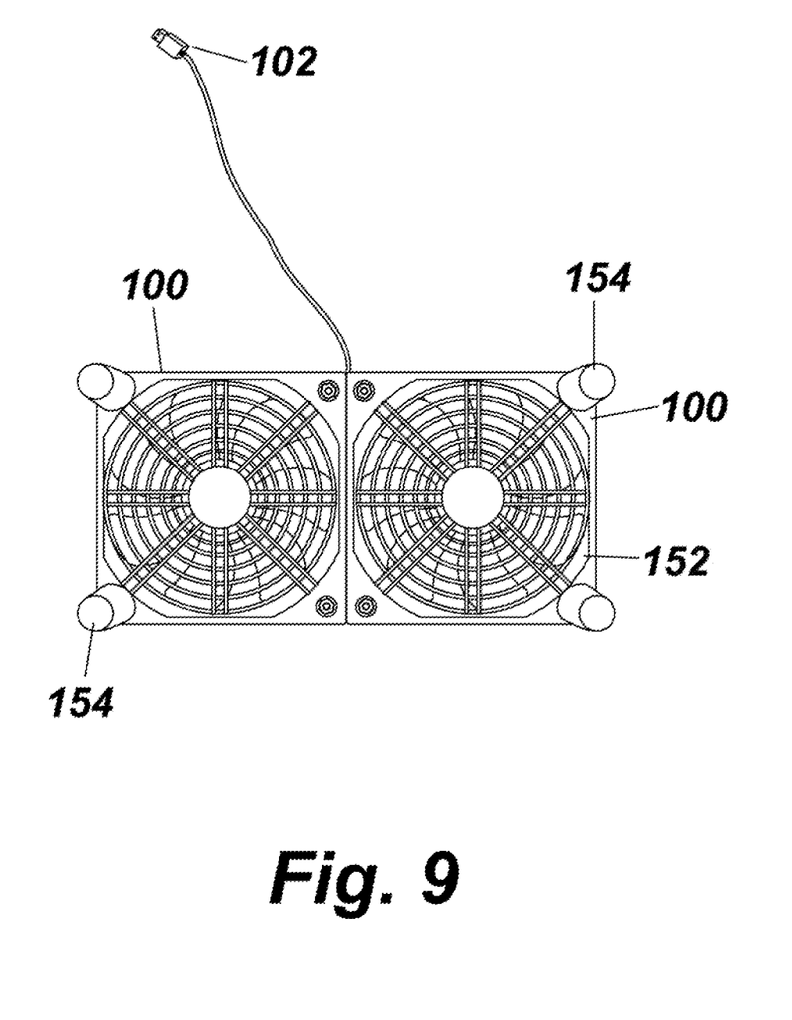
FIG. 9 is a lower perspective view of the blade tray.

An extension tray 130 is securable to the slide member 110 to provide a further storage area to support the grooming procedure. Similar to the storage tray 70, the extension tray 130 may be secured to the slide member 110 by fasteners or tabs for interlocking. The extension tray 130 has a length of generally about 290 mm and a width of generally about 124 mm. The extension tray 130 has a plurality of openings 132 sized for receipt of scissors, not shown and openings 134 for trimmers, not shown. Two openings 132 have a dimension of generally about 38 mm by 50.8 mm for use in holding scissors. Three openings 134 have a dimension of generally about 25.4 mm square for use in holding clippers. A circular opening 136 has a diameter generally about 100 mm and is used as a holder for a cup, mug or miscellaneous tray, not shown. A cell phone receptacle 140 is provided to hold a conventional sized cell phone, the receptacle 140 having a width of generally about 25.4 mm and a length of generally about 120 mm.

In one embodiment the cooling fan 100 includes a USB receptacle 152 that is electrically coupled to the fan's USB inlet plug 102 wherein a cell phone, not shown, placed in the receptacle 140 can be attached to the cooling fan USB receptacle 152 for recharging of a cell phone from the cooling fan's USB inlet port 102. The storage tray 70 may be directly placed on a table with non slip bases 154 to maintain a distance between the fans and a table. Similarly the storage tray 70 may be secured to a wall using fasteners placed through wall hanging slots 156. In the preferred embodiment, two cooling fans 100 are employed having a substantially square shape wherein placement in a side by side position allows for a rectangular shape of the tray 70.

It is to be understood that while a certain form of the invention is illustrated, it is not to be limited to the specific form or arrangement herein described and shown. It will be apparent to those skilled in the art that various changes may be made without departing from the scope of the invention, and the invention is not to be considered limited to what is shown and described in the specification and any drawings/figures included herein.

What is claimed is:

1. A storage tray for use with a pet grooming table having a vertically disposed grooming arm comprising:
    a rectangular frame member formed from a support plate having an upper surface and a lower surface with a plurality of vent holes extending therebetween, said frame member having a front side wall spaced apart from a rear side wall, and a left side wall spaced apart from a right side wall, each of said side extending upwardly from said upper surface of said support plate;
    a plurality of slanted tray surfaces positioned between said left and right sidewall and above said upper surface of said frame member, each said slanted surface constructed and arranged to receive a cutting blade;
    at least one cooling fan secured to said lower surface of said floor section, said cooling fan electrically coupled to a power source and used to force air through said vent holes to assist in dissipating heat from each said cutting blades placed on each said slanted surface; and
    a clamp mechanism attached to said rear side wall for use in securing said frame member to the vertically disposed grooming arm of a pet grooming table.

2. The storage tray according to claim 1 wherein said clamp mechanism is defined as a slide member attached to said rear wall of said frame member, said slide member having at least one aperture constructed and arranged to be slidably positioned over said vertically disposed grooming arm, and a bracket member comprising a first element releaseably coupled to a second element positioned about said grooming arm wherein said slide member frictionally engages said grooming arm and operates as a platform to maintain said frame member at a height above the grooming table.

3. The storage tray according to claim 1 wherein said clamp mechanism is defined as cavity bounded between said rear wall and a slanted surface, and said left side wall and said right side wall, a portion of said right side wall is releaseably securable forming an access door for use when attaching said storage tray to a vertical disposed grooming arm, said cavity including at least one compressible foam rubber spacer to frictionally engage said vertical arm for securing said frame member to the vertical arm.

4. The storage tray according to claim 1 including an extension tray securable to said frame member, said extension tray including a plurality of openings for receipt of a least one scissor and at least one trimmer.

5. The storage tray according to claim 4 wherein two of said openings having a dimension of generally about 38 mm by 50.8 mm for use in holding scissors.

6. The storage tray according to claim 4 wherein three of said openings having a dimension of generally about 25.4 mm square for use in holding clippers.

7. The storage tray according to claim 4 including a circular opening having a diameter generally about 100 mm for receipt of a coffee mug or tray.

8. The storage tray according to claim 1 wherein said cooling fan includes a Universal Serial Bus plug for electrically coupling to a power supply.

9. The storage tray according to claim 2 wherein said cooling fan includes a Universal Serial Bus receptacle electrically coupled to a Universal Serial Bus plug wherein said Universal Serial Bus receptacle is available to receive a charging cord from a cell phone.

10. The storage tray according to claim 9 including a receptacle for a cell phone, said cell phone receptacle having a width of generally about 25.4 mm and a length of generally about 120 mm.

11. The storage tray according to claim 1 wherein each said slanted surface includes a marble or ceramic heat sink for use in dissipating heat upon contact with said cutting blade.

12. The storage tray according to claim 1 wherein said frame member is constructed from plastic or aluminum.

13. A storage tray comprising:
    a rectangular frame formed from a front sidewall spaced apart from a rear sidewall by a first and second sidewall;
    a plurality of tray sections positioned between said first and second sidewall, each said tray section having at least one slanted surface;
    a marble material secured to each said slanted surface; and
    an access door releaseably secured to said second sidewall, said access door constructed and arrange to facilitate attachment of said tray to a vertical arm of a pet grooming table.

14. The storage tray according to claim 13 wherein said tray includes an adjustable cavity for securing to said vertical arm, said adjustable cavity provided by a compressible foam rubber spacer.

* * * * *